Nov. 6, 1928.

F. C. MOCK 1,690,546

CONTROLLER FOR VEHICLE SPRINGS

Original Filed Aug. 8, 1924  2 Sheets-Sheet 1

Witnesses:

Inventor:
Frank C. Mock

Nov. 6, 1928.
F. C. MOCK
CONTROLLER FOR VEHICLE SPRINGS
1,690,546
Original Filed Aug. 8, 1924    2 Sheets-Sheet 2
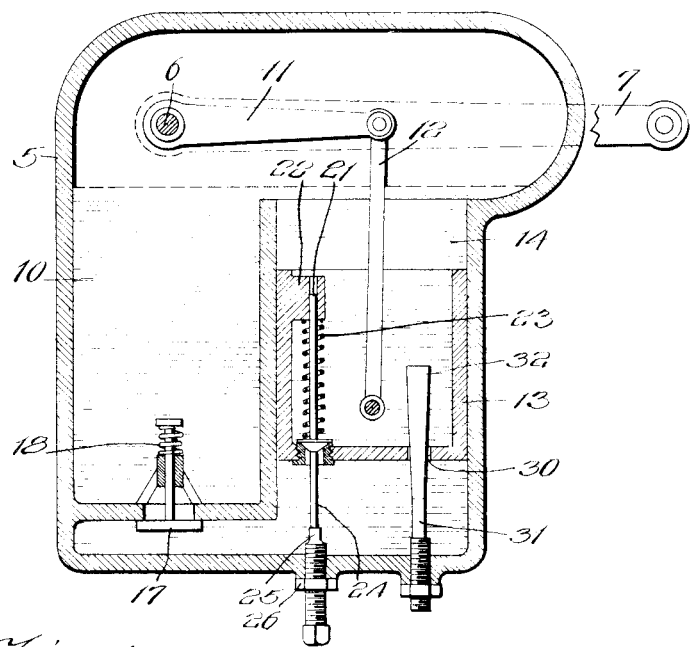
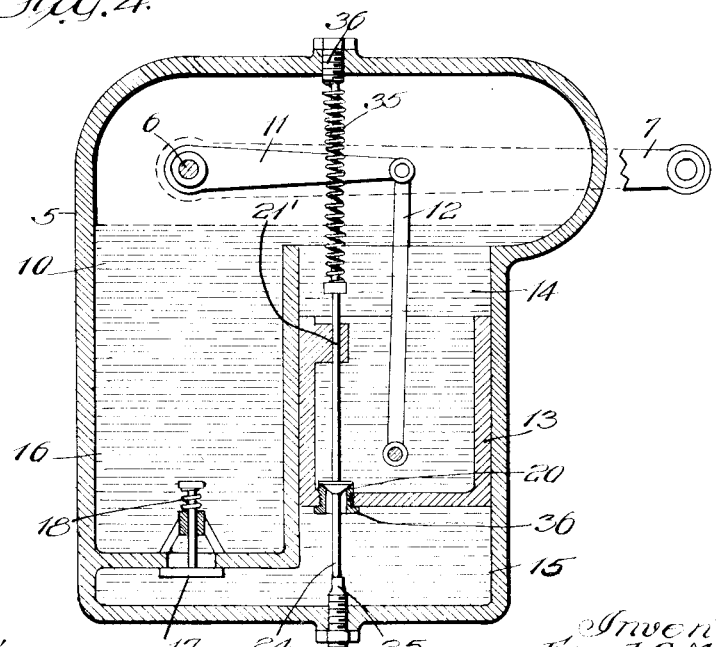

Patented Nov. 6, 1928.

1,690,546

UNITED STATES PATENT OFFICE.

FRANK C. MOCK, OF CHICAGO, ILLINOIS, ASSIGNOR TO STROMBERG RESEARCH CORPORATION, OF CHICAGO, ILLINOIS, A CORPORATION OF ILLINOIS.

CONTROLLER FOR VEHICLE SPRINGS.

Application filed August 8, 1924, Serial No. 730,806. Renewed April 15, 1927.

My invention relates to controllers for vehicle springs or the like. While the present invention is peculiarly applicable to use on motor vehicles it is not to be limited to such use.

In my copending application, Serial No. 729,459 filed August 1, 1924, I have explained the general character and effect of road irregularities, and have pointed out that to secure proper riding of a vehicle as now constructed, the spring or springs should be as free of friction or other resistance as possible for flexing thereof, as the body and axle approach each other, and should encounter a graduated resistance to recoil from maximum spring deflection back to normal or neutral position, and further separation of spring and axle should be free to occur in order to permit the vehicle wheel to drop into a hole or down a short drop, without dragging the body down with it.

Now in the present application I disclose and claim a controller which employs as a resistance means a body of confined fluid and an orifice or orifices through which this fluid escapes.

In such a controller the pressure or resistance afforded is a function of the square of the velocity of movement through the orifice so that the control exerted by said resistance may be termed velocity control. Upon the inherent velocity control which a device of this character affords, I superpose positional control in order to disable or release the resistance at a given point or position.

Such positional release of the return resistance may operate in connection with a fixed orifice, so that a pure velocity control is secured, or with an orifice graduated in accordance with variable position in order that the return motion may be variable, or in accordance with pressure control so that the early part of the return motion may be more rapid than the later, or in accordance with any other desired variable.

Now, in order to acquaint those skilled in the art with the manner of constructing and operating a device according to my invention, I shall now describe a specific embodiment thereof in connection with the accompanying drawings in which;

Fig. 3 is a similar vertical sectional view of a modification; and

Fig. 4 is a similar view of another modification.

Figure 1:
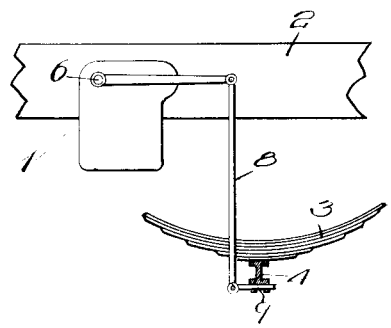
Figure 1 is a side elevational view showing the location of the frame, the axle, the vehicle spring and the controller in relation to each other.

The controller 1 is mounted upon the frame 2 of the vehicle, this frame being connected by the usual leaf spring 3 with the axle 4.

The leaves of the spring 3 are made to be as nearly as possible free of friction as by grinding of the contacting surfaces and thereafter coating with a thin film of protecting metal as by sherardizing, cold galvanizing or by nickel plating to secure a noncorrodible surface. The leaves are well lubricated as by means of grease or oil and preferably spring jackets or covers are employed for this purpose.

The controller comprises a main casing 5 which mounts at its upper end a cross shaft or rocking shaft 6 to the outer end of which outside of the casing 5 there is attached an arm 7 connected by a link or connecting rod 8 to a suitable bracket 9 on the axle. The connecting rod 8 transmits both upward and downward motion, that is both in tension and in compression, the rocking shaft 6 is suitably journaled in the housing, which housing is oil-tight for the purpose of preserving a body of fluid, in this case oil, as indicated at 10. Any suitable liquid such as glycerine or glycerine and alcohol of the desired consistency and fluidity may be employed. Within the housing 5 a short rocker arm 11 is keyed to the shaft 6 and the end of the arm 11 is in turn connected by means of a connecting rod 12 to a piston 13 which is thereby adapted to be moved up and down in a cylinder 14 as the shaft 6 is oscillated or rocked.

The housing 5 is divided into three parts; namely the cylinder 14, the clearance chamber 15 and the overflow 16. Between the clearance chamber and the overflow 16 I provide the check valve 17, which is of the poppet type, held closed by a suitable spring 18 which is intended to be sufficient only to cause prompt closing of the valve 17 when the pressures upon opposite sides thereof are substantially equal. The clearance space 15 and the overflow chamber 16 are also connected in the form shown in Fig. 2 by the fixed orifice 19, which permits the discharge of liquid into the overflow when the piston 13 moves downwardly.

The piston 13 carries a poppet valve 20 seating in a suitable seat and closing a port in the head of the piston 13. This valve 20 has a stem extending to the rear as indicated at 21 and guided in a suitable guide 22, a spring 23 being interposed to hold the valve closed against the working pressure of the fluid in the clearance space 15 as the plunger or piston 13 descends in the normal operation of the device.

The guiding stem 21 extends out in front of the piston 13 as indicated at 24, to engage with a stop 25 which is formed by the upper end of a suitable adjusting screw threaded into a socket in the bottom of the casing and locked in place as by means of the lock nut 26. If desired the head of the screw 25 and the lock washer may be covered by a cap which screws on the outside of the boss in which said screw 25 is threaded.

The operation of this form will be apparent from the above description and it may briefly be recapitulated as follows:

Assume that the parts are in the normal or neutral position as indicated in Fig. 1. Now if the spring is compressed as by encountering a rise in the road, the connecting rod 8 will raise the lever 7 and rock the shaft 6 which in turn through the connecting rod 12 raises the piston 13 in the cylinder 14, drawing the working fluid from the overflow chamber 16 into the clearance space 15 and into the lower end of the cylinder 14 through the automatic check valve 17 which opens up to permit liquid to be drawn from chamber 16 into chamber 15 and thence into cylinder 14, but which closes instantly upon reversal of pressure under the action of its spring 18. The amount of fluid which under suction of piston 13 can pass through the orifice 19 is at this time, inconsequential. The valve 20 is held closed by a spring 23 and at this time does not function.

After the pressure of the spring 3 has been increased to the point where the body or the frame 2 begins to move away from the axle, the piston 13 begins to descend. The valve 17 immediately closes and liquid is trapped in the cylinder and in the clearance space and is driven out through the orifice 19 at a rate depending upon the square root of the pressure exerted by the spring 3, that is, the rate of flow is not a direct function of pressure as is well known, and the pressure in the chamber 15 must increase very rapidly in order to increase the flow through the orifice 19. In other words, the resistance which the orifice 19 affords is of a character which will present over the short distance and a short range herein considered, substantially a uniform or limiting velocity of return of the piston 13, until the frame has nearly reached its normal position with respect to the axle. As the axle 4 and frame 2 separate to the position corresponding to normal or loaded position, the stem 24 of the valve 20 encounters the stop 25 and throws the valve open freeing the piston 13 against further resistance of the oil. This freeing of the piston of the resistance of the liquid is important, in that it permits the axle to drop down freely when the wheel runs into a hole or encounters a depression or decline in the road bed.

Movement of the axle below normal position with respect to the frame is permitted freely, and this means that the spring suspension of the vehicle is able to take up depressions in the road bed with much less jarring or abrupt motion of the body than is possible where resistance of any kind is interposed to the expansion of the spring 3 below normal or neutral position.

Figure 2:
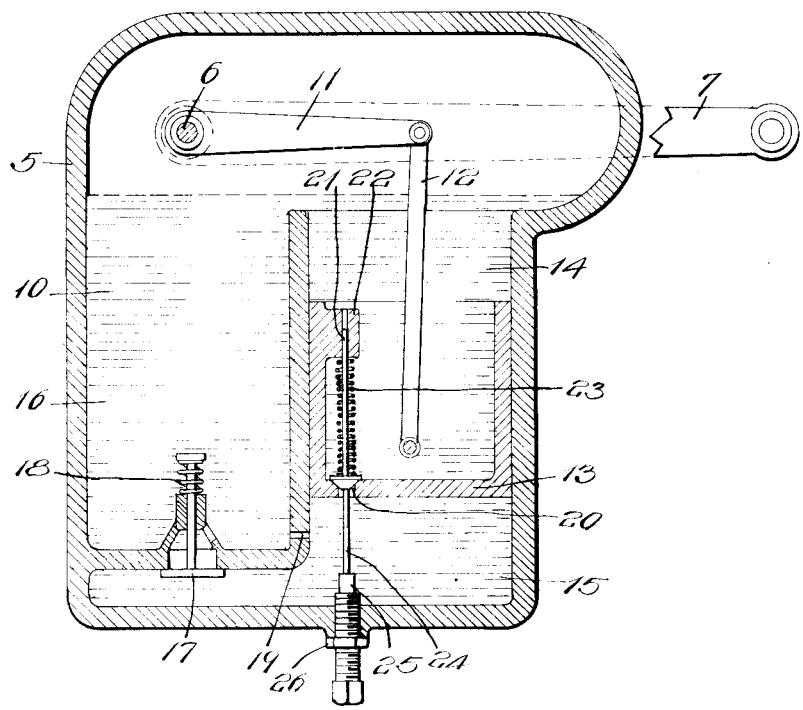
Fig. 2 is a vertical sectional view in the plane of the paper showing the internal working parts of a controller such as indicated in elevation in Fig. 1.

While in Fig 2 the return of the piston 13 is permitted at only a fixed or substantially fixed speed, in the form which I have shown in Figs. 3 and 4 the velocity of return is graduated by a control of the size of the controlling orifice. In Fig. 3 I omit the fixed orifice 19 and substitute therefore, an orifice 30 in the head of the cylinder 13, this orifice being in turn controlled by a tapered pin 31, the upper end of which forms a needle valve or control 32 for the orifice 30 for position corresponding to greater deflection of the spring 3 and increasing the size of the orifice 30 for positions approaching the normal or neutral position of the spring 3. In this construction also I employ the positionally controlled valve 20 for releasing all resistance to motion of the piston 13 when the stem 24 strikes the stop 25, this position corresponding substantially to the normal or neutral position of the axle with respect to the frame.

In other respects the device shown in Fig. 3 is like that shown in Figs. 1 and 2.

The resulting action of the structure shown in Fig. 3 is that less resistance is opposed to return of axle as spring approaches normal position and hence a greater velocity of return is permitted, as the axle 4 approaches the neutral position. As soon as the axle 4 reaches its substantially normal or neutral position the release valve 20 is opened and further movement of the axle 4 away from the frame is permitted substantially without further resistance.

In the form shown in Fig. 4 the controlling spring 35 for the release valve 20 is adapted to be put under greater tension for greater displacement of the spring 3, that is approaching of the axle 4 and frame 2, so that the retarding action will be greater at first and will decrease as the axle 4 reaches its neutral position, but upon approaching this neutral position the stem 24 of the control or release valve 20 engages the stop 25 and permits free movement of the piston 13 downwardly for all positions of the axle below normal or neutral position. The spring 35 is compressed between a suitable spring stop 36 mounted in the upper end or top wall of the casing, this spring stop 36 being preferably adjustable to give the device the desired initial tension. At its lower end of the spring 35 engages the top of a stem 21' so that as the piston 13 rises due to approach of the axle and the frame towards each other, the spring will be put under greater compression and hence will tend to offer greater resistance to flow through the valve port 36 which is controlled by said valve 20.

Now it is to be noted that the valve port 36 performs a dual function of first a graduated controlling orifice and next of a release port when valve 20 is lifted from it by engagement of the stem 24 with the stop 25.

The opening of the valve 20 by the stem 24 provides in each form an escapement path which permits a free passage for liquid from the working cylinder for normal rates of liquid flow. The device is intended to regulate the spring recoil due to inertia of the body so that the velocity of movement will be low when the neutral range is reached. There are, however, combinations of circumstances where the piston passes through the neutral range at a relatively high velocity. It is here that the inherent value of an orifice for liquid flow is best appreciated, because even though the valve 20 is opened it does not mean that the piston 13 can be moved at great velocity without resistance. For low rates of movement of the piston the orifice of open valve 20 permits of free movement of the piston, but if it were attempted to move the piston 13 violently past neutral position the open valve could not pass the liquid fast enough to permit free movement of the piston.

In each of the forms above shown the device affords resistance to the recoil of the vehicle spring in the region which I have termed in my copending application the inertia deflection and permits free recoil of the vehicle spring in the region which I have therein termed weight or static deflection.

In the present specification and claims I speak of releasing the pressure of the fluid in the cylinder below the piston. It will be apparent from the foregoing that I prefer to make the release complete enough to permit the wheel to drop freely into a hole, but I do not intend thereby to be limited to complete release of all fluid pressure therein, as obviously less than complete release may be employed without departing from my invention, and certain of the advantages of my invention secured thereby.

I do not intend to be limited to the details shown or described.

I claim:

1. In a fluid controller for vehicle springs adapted to be connected between a body and an axle, the combination of a body of fluid, a container for the fluid, said container having a movable piston, means permitting free movement of the fluid with the piston as the body and axle approach each other and affording resistance to movement of the fluid for reverse movement of the piston as the body and axle separate, and means for releasing the resistance to movement of the fluid during the last part of the reverse movement of the piston.

2. In a fluid controller for vehicle springs and the like, a body of liquid, a housing for the liquid, said housing having a cylinder and a piston movable therein, means for permitting free movement of the liquid into the cylinder with the piston for all motions of the piston corresponding to compression of the vehicle springs, said means having an orifice affording resistance to movement of the liquid out of the cylinder for reverse movement of the piston corresponding to recoil of the vehicle springs and means for releasing the pressure on the fluid in the cylinder during the latter part of the reverse movement of the piston corresponding to expansion of the vehicle spring below its normal position.

3. In a fluid controller for vehicle springs and the like, a body of fluid, a container for the fluid, said container having a movable piston, means permitting free movement of the liquid with the piston in one direction and having an orifice affording resistance to movement of the fluid for reverse movement of the piston, means for graduating the resistance of fluid flow for different positions of the piston on its reverse movement, and means for releasing the resistance of movement of the fluid during the last part of the reverse movement of the piston corresponding to expansion of the vehicle springs below normal position.

4. In a fluid controller for vehicle springs and the like, a housing having a cylinder, a body of liquid in said housing, a piston for the cylinder, means connecting the piston with an operating arm, said piston being actuated to draw liquid into the cylinder during motion of the vehicle spring in compression, means including an orifice for retarding the flow of liquid out of the cylinder or motion of the piston corresponding to expansion of the vehicle spring, valve means carried by the piston, said valve means being opened when the vehicle spring has expanded to substantially its normal position.

5. In a controller of the class described, a cylinder, a piston therefor, an overflow chamber, a check valve between the overflow chamber and the cylinder, a valve carried by the piston and cooperating means carried by the cylinder for opening the valve to permit free movement of the piston by releasing the pressure in the cylinder when the piston has moved to a predetermined position.

6. In a controller for vehicle springs and the like, the combination of a housing having a cylinder and overflow chamber, a piston in the cylinder and means including a normally closed spring loaded valve for releasing the pressure in the cylinder when the piston reaches a predetermined position in its return stroke.

7. In a controller of the class described, a housing comprising a cylinder having a piston, an overflow chamber, a check valve between the overflow chamber and the cylinder permitting free outward motion of the piston, a valve carried by the piston and cooperating means on the housing for opening the valve which is carried by the piston upon the attainment of a predetermined position of the piston in its inward movement.

8. In a controller of the class described, a housing having a cylinder, a piston in the cylinder, an overflow chamber, a check valve admitting fluid freely from the chamber to the cylinder, a valve carried by the piston and having considerable play with respect thereto, and means carried by the housing for opening the valve when the piston has reached a predetermined position in its return motion, and for permitting free movement of the piston for all return movements beyond said predetermined position.

9. In a controller of the class described, a housing having a cylinder, a piston in the cylinder, an overflow chamber, a check valve admitting fluid freely from the chamber to the cylinder, a valve carried by the piston and having a considerable play with respect thereto, and means carried by the housing for opening the valve when the piston has reached a predetermined position in its return motion, and for permitting free movement of the piston for all return movements beyond said predetermined position, and additional means for controlling the rate of expulsion of liquid from the cylinder during the return motion of the piston to said predetermined position.

10. In a controller for vehicle springs, and the like, the combination of a fluid cylinder, a piston therefor, an automatic check valve for the cylinder, and a release valve for permitting the escape of fluid from the cylinder when the piston has moved to a predetermined position in its inward stroke in the cylinder.

11. In combination in a vehicle, an axle bearing a wheel, a frame, a vehicle spring between said axle and frame, said spring having a predetermined flexure for normal load of the vehicle, means creating a force opposing expansion of the spring when the same is flexed beyond normal loading position and means for releasing said opposing force for expansion of the spring beyond normal loading position to permit the wheel to drop freely into a hole in the road bed.

12. In combination in a vehicle, an axle bearing a wheel, a frame, a vehicle spring between said axle and said frame, said spring having a predetermined flexure for normal load of the vehicle, means creating a graduated opposing force for opposing expansion of the spring, said means providing a spring expansion opposing force increasing for increased deflection of the spring beyond normal loading position, and means for releasing said opposing force for expansion of the spring beyond normal loading position to permit the wheel to drop freely into a hole in the road bed.

13. In a fluid controller for vehicle springs, a body of fluid, a container for the fluid, said container having a movable piston, means permitting substantially free movement of the fluid with the piston in one direction and affording resistance to movement of the fluid for reverse movement of the piston, means controlled by pressure of the fluid for effecting release of a portion thereof, and a positional control member for modifying the effect of said pressure controlled means for all positions of the piston beyond a predetermined neutral position.

14. In a hydraulic spring rebound controller, a fluid container including a cylinder, a piston therefor, a check valve for permitting substantially free inflow of fluid into the cylinder on the outward stroke of the piston and for checking outflow of the fluid from said cylinder, a relief port, a normally closed valve for said port, and a loading spring for said valve, the effective spring pressure of which is regulated by the position of the piston in the cylinder.

15. In a hydraulic rebound controller, a fluid container including a cylinder, a movable piston therefor, a check valve for permitting substantially free inflow of fluid into the cylinder on the outward stroke of the piston and for checking outflow of the fluid from the cylinder, a relief passage opened to a variable extent in accordance with the position of the piston in respect to the cylinder, and a valve opened for all positions of the piston in the cylinder beyond a predetermined neutral position.

16. In a hydraulic spring rebound controller, a fluid container comprising a cylinder, a piston therefor, a check valved inlet for the cylinder providing directional resistance to movement of the piston in the cylinder, a valve having a port providing positional release of pressure in the cylinder, said cylinder having a by-pass providing velocity control of resistance to movement of the piston.

17. In a controller for vehicle springs adapted to be connected between a body and an axle, the combination of a piston, a cylinder, an overflow chamber, means providing a discharge port between said cylinder and overflow chamber, a normally closed spring pressed valve providing a pressure control of said port for limiting the pressures obtainable in the cylinder, and means for limiting the spring pressure on said valve when the piston arrives at a predetermined position in its outward movement corresponding to separation of the body and axle.

18. In a controller for vehicle springs adapted to be connected between a body and an axle, the combination of a housing having a cylinder and overflow chamber, a piston in the cylinder, a motion controlling bypass port from the cylinder to the overflow chamber, a valve normally closing the port, and a spring pressing the valve against the port with a pressure varying with the position of the piston in its cylinder.

In witness whereof, I hereunto subscribe my name this 3rd day of July, 1924.

FRANK C. MOCK.